United States Patent [19]

Schürfeld

[11] 4,242,018
[45] Dec. 30, 1980

[54] BORING TOOL

[75] Inventor: Horst Schürfeld, Bielefeld, Fed. Rep. of Germany

[73] Assignee: Gildemeister-Devlieg System-Werkzeuge GmbH, Bielefeld, Fed. Rep. of Germany

[21] Appl. No.: 20,519

[22] Filed: Mar. 14, 1979

[30] Foreign Application Priority Data

Mar. 18, 1978 [DE] Fed. Rep. of Germany ....... 2811965

[51] Int. Cl.³ ............................................. B23B 51/00
[52] U.S. Cl. ..................................... 408/182; 408/157
[58] Field of Search ................ 408/147, 153, 157, 182, 408/183, 185, 186, 199, 211, 188, 189

[56] References Cited
U.S. PATENT DOCUMENTS 4,043,697  8/1977  Eckle ................................. 408/182
4,101,239  7/1978  Wohlhaupter ...................... 408/182

*Primary Examiner*—Harrison L. Hinson
*Attorney, Agent, or Firm*—Peter K. Kontler

[57] ABSTRACT

The head of the boring bar of a boring tool has a recess flanked by two toothed internal surfaces which extend forwardly and outwardly with respect to the axis of the bar and face each other. The bit carriers have toothed surfaces which engage the respective internal surfaces and are clamped against such internal surfaces by screws whose shanks extend into tapped bores of the head. The axes of the tapped bores make an acute angle or are parallel with the axis of the bar, depending on the diameter of the bar. Each carrier has an elongated slot for the shank of the respective clamping screw, and each carrier can be shifted lengthwise of the respective teeth by a discrete adjusting screw which meshes with the bar.

9 Claims, 3 Drawing Figures

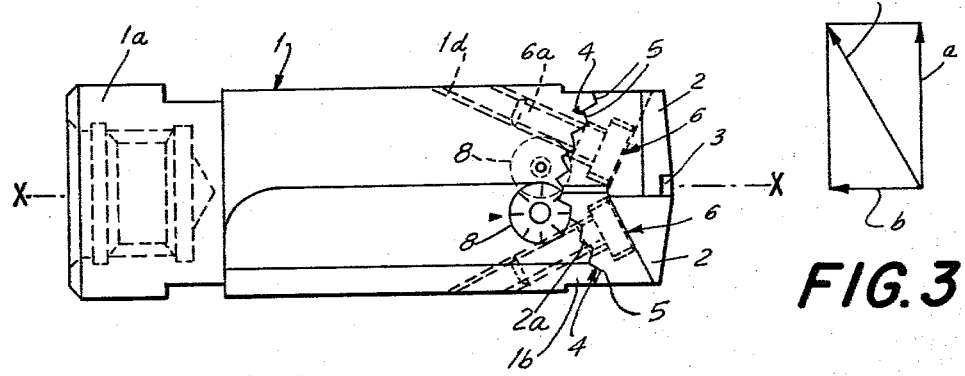
FIG.1  FIG.3
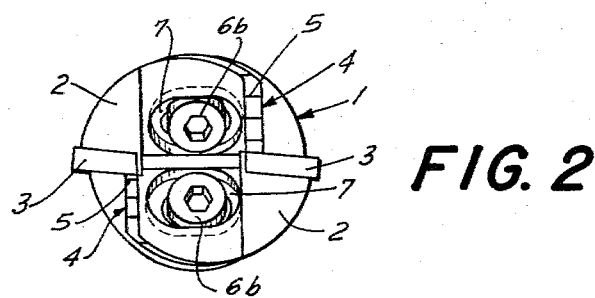
FIG.2

BORING TOOL

BACKGROUND OF THE INVENTION

The present invention relates to boring tools in general, and more particularly to improvements in boring tools of the type wherein the head of a boring bar or analogous holder supports adjustable carriers for boring bits. Still more particularly, the invention relates to improvements in boring tools wherein the head of the boring bar has teeth mating with complementary teeth of the bit carriers and wherein the carriers are formed with elongated slots for the shanks of screws which clamp the carriers to the head so that, if and when necessary, the bits can be moved toward or away from the axis of the bar.

German Offenlegungsschrift No. 2,533,495 discloses a boring tool wherein the front end face of the head of the boring bar is formed with teeth which mate with complementary teeth of two bit carriers. A drawback of such boring tools is that, when the tool is rotated to cause the bits to penetrate into the material of the workpiece, the resultant force which must be taken up by the teeth of the head and of the carriers invariably comprises a component which tends to lift the carriers off the head of the boring bar. Therefore, the forces which are to be applied by the means for clamping the carriers to the head of the boring bar must be increased by using extremely strong and bulky bolts or screws. Moreover, the tendency of the resultant cutting force to lift the carriers off the head of the boring bar results in wobbling of the tool when in actual use.

The heads of boring bars in certain other presently known boring tools are provided with toothed surfaces which are parallel to the axis of the boring bar. Such tools exhibit the same drawbacks as the tools wherein the toothed surfaces form part of or constitute the front end face of the head of the boring bar and wherein such front end face is normal to the axis of the bar. In other words, the resultant cutting force tends to lift the carriers off the head when the tool is in actual use.

OBJECTS AND SUMMARY OF THE INVENTION

An object of the invention is to provide a novel and improved boring tool which is constructed and assembled in such a way that the forces which develop when the bits penetrate into the material of a workpiece tend to urge the carriers for the bits against the head of the boring bar.

Another object of the invention is to provide a novel and improved boring bar for use in a tool of the above outlined character.

A further object of the invention is to provide novel and improved bit carriers for use in the improved boring tool.

An additional object of the invention is to provide a boring tool which can be used as a superior and longer-lasting substitute for presently known boring tools of the type wherein teeth on the bit carriers mate with teeth on the head of the boring bar.

Another object of the invention is to provide a boring tool which can utilize slender or large-diameter boring bars without unduly affecting the magnitude of forces which urge the carriers against the head of the improved bar.

A further object of the invention is to provide a boring tool wherein the carriers for bits can be safely secured to the head of the boring bar by resorting to relatively small clamping or securing elements.

The invention is embodied in a boring tool which comprises an elongated rotary bar having a front portion or head. The head has a front face and a prismatic recess in the front face. The front face includes a plurality of mutually inclined internal surfaces in the recess, and such internal surfaces have parallel teeth extending transversely of the axis of the boring bar. The boring tool further comprises a plurality of bit carriers each of which has a surface adjacent to one of the internal surfaces and provided with teeth mating with the teeth of the respective internal surface. The carriers have elongated slots which extend in substantial parallelism with the teeth of the respective internal surfaces, and the tool further comprises screws or analogous securing or clamping elements having threaded portions or shanks extending through the respective slots and into tapped bores provided in the boring bar. The heads of the clamping elements urge the carriers against the respective internal surfaces.

The front face of the head is preferably formed with two internal surfaces which are located diametrically opposite each other with respect to the axis of the boring bar. Such internal surfaces preferably flare forwardly and outwardly from the axis of the boring bar.

The threaded portions of the clamping elements may make an acute angle with the axis of the boring bar, or their axes may be parallel to the axis of the bar, depending on the dimensions (diameter) of the bar.

The boring tool preferably further comprises screws or other suitable means for shifting the carriers lengthwise of the teeth on the corresponding internal surfaces to thereby move the associated bits toward or away from the axis of the boring bar. Each carrier is adjustable independently of the other carrier or carriers.

The novel features which are considered as characteristic of the invention are set forth in particular in the appended claims. The improved boring tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a side elevational view of a boring tool which embodies the invention;

FIG. 2 is a front elevational view as seen from the right-hand side of FIG. 1; and FIG. 3 is a diagram of forces which develop in the course of a boring operation.

DESCRIPTION OF THE PREFERRED EMBODIMENTS

The boring tool which is shown in the drawing comprises an elongated rotary holder or bar 1 a rear portion 1a of which can be installed in the chuck of a boring machine including a prime mover which rotates the bar 1. A front portion or head 1b of the bar 1 is connected with two detachable carriers 2 for discrete cutters or bits 3. The carriers 2 are angularly offset with respect to each other by 180 degrees and the bits 3 extend outwardly beyond the respective carriers 2, as considered in the radial direction of the head 1b.

The carriers 2 are installed in a V-shaped recess or cutout 4 which is machined into the front end face of the head 1b. Two internal surfaces which flank the recess 4 are formed with teeth 5 which extend transversely of the axis X—X of the bar 1. Each carrier 2 has a surface with complementary teeth 2a which mate with the teeth 5 on the respective internal surface in the recess 4. The carriers 2 are shiftable radially of the bar 1 to thereby move the bits 3 nearer to or further away from the axis of the bar, i.e., to change the diameter of the bore or hole which is formed by the improved tool. The planes of the internal surfaces which are provided with teeth 5 make an acute angle with the axis X—X of the bar 1; this is clearly shown in FIG. 1. Such planes extend forwardly and outwardly with respect to the axis X—X.

The means for holding the carriers 2 in selected positions of adjustment with respect to the bar 1, i.e., for maintaining the bits 3 at a selected distance from the axis X—X, comprises two clamping elements here shown as screws 6 which extend through elongated slots 7 of the respective carriers 2. The longitudinal directions of the slots 7 are parallel to the longitudinal directions of the respective teeth 5 in the recess 4. Externally threaded portions or shanks 6a of the screws 6 extend into tapped bores 1d of the bar 1, and heads 6b of the screws 6 are outwardly adjacent to the respective slots 7. The diameters of the heads 6b exceed the width of the respective slots 7.

The bar 1 further carries and meshes with the shanks of two adjusting screws 8, one for each carrier 2, which can be rotated to thereby move the corresponding carriers 2 in the longitudinal direction of the respective sets of teeth 5 when the screws 6 are loose. The exposed end faces of the adjusting screws 8 are preferably provided with graduations (shown in FIG. 1) which move past stationary indices or markers on the bar 1 to indicate the selected positions of the carriers 2 in the recess 4.

FIG. 3 shows the parallelogram of forces which act upon the carriers 2 in the course of a boring operation. The force c is the resultant of forces a and b. The force a is the main cutting force which the bits 3 apply to the material of the workpiece while the bar 1 rotates. The force b is the force which is applied in the axial direction of the bar 1 to cause the bits 3 to move forwardly into the workpiece. The resultant force c urges the respective carrier 2 against the corresponding toothed internal surface in the recess 4. Thus, by using suitably inclined toothed surfaces in the recess 4, one can insure that the carriers 2 are actually urged against the bar 1 in the course of a boring operation.

In the illustrated embodiment, the axes of the clamping screws 6 are normal to the respective toothed internal surfaces in the recess 4. This is the preferred orientation of screws 6 because their clamping action is at a maximum value. However, it is not absolutely necessary that the axes of the screws 6 be exactly normal to the respective toothed internal surfaces in the recess 4. For example, if the carriers 2 are mounted on or in the head 1b of a relatively slender bar 1, the acute angles between the axes of the screws 6 and the axis X—X of the bar 1 can be reduced all the way to zero, i.e., the screws 6 can be installed in such positions that their axes are parallel or nearly parallel to the axis X—X. In other words, the acute angle between the axis of each screw 6 and the axis X—X of the bar 1 can vary between zero and that (maximum) value at which the axes of the screws 6 are normal to the respective toothed internal surfaces in the recess 4. It is preferred to mount the screws 6 in a manner as shown in FIG. 1 because such mounting insures an optimum (maximal) clamping or securing action. The entire clamping force is then used to urge the toothed surfaces of the carriers 2 against the respective toothed surfaces in the recess 4. Of course, and as stated above, this is possible only when the diameter of the bar 1 suffices to drill therein the bores 1d at an acute angle to the axis X—X. The bar 1 must be strong enough to furnish the necessary reaction force which opposes the clamping forces.

Boring tools of the type to which the invention pertains can be furnished in many sizes and shapes. If the diameter of the bar 1 is very small, the bar could not furnish the necessary reaction force if the axes of the tapped bores 1d were inclined with respect to its axis X—X or if the inclination of such bores were sufficiently pronounced to insure that the axes of the clamping screws 6 would be normal to the toothed surfaces in the recess 4. In such instances, the angles between the axes of the screws 6 and the axis X—X of the bar 1 are reduced. As mentioned above, these angles can be reduced all the way down to zero. The resultant forces c then make an oblique angle with the respective toothed surfaces in the recess 4, i.e., the effective forces which urge the toothed surfaces of the carriers 2 against the toothed surfaces in the recess 4 are smaller than the resultant force c. An advantage of bores 1d which are parallel to the axis of the holder 1 is that the machining of such bores is simpler than the machining of bores whose axes are inclined with respect to the axis X—X of the bar 1.

The axes of the two tapped bores 1d in the boring tool of FIGS. 1 and 2 are disposed in a common plane which includes the axis X—X of the bar 1.

An important advantage of the improved boring tool is that the resultant forces c enhance the clamping action of the screws 6 so that the tool can use relatively small and weak clamping elements 6. Moreover, the operation of the improved tool is surprisingly quiet and free of vibrations; therefore, the tool can be used for the making of bores with an extremely high degree of precision. The screws 6 and the adjusting screws 8 are readily accessible for adjustment, inspection and/or replacement of bits 3 and/or carriers 2.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. A boring tool, comprising a rotary boring bar having a head, said head having a front face and means delimiting a recess in said front face, said delimiting means including a plurality of mutually inclined internal surfaces flaring frontwardly and outwardly from the axis of said bar and having teeth extending transversely of said axis; a plurality of bit carriers each having a surface which is adjacent to one of said internal surfaces in said recess and is provided with teeth mating with the teeth of the respective internal surface, said carriers having elongated slots extending in substantial parallelism with the teeth of the respective internal surfaces;

and securing elements extending through said slots and having threaded portions mating with tapped bores provided therefor in said bar, said elements being arranged to urge said carriers against the respective internal surfaces.

2. The boring tool of claim 1, wherein said delimiting means includes two of said internal surfaces located diametrically opposite each other with reference to the axis of said bar.

3. The boring tool of claim 1, wherein the axes of said threaded portions make an acute angle with the axis of said bar.

4. The boring tool of claim 1, wherein the axes of said threaded portions and of said tapped bores are parallel to the axis of said bar.

5. The boring tool of claim 1, further comprising adjusting means operable to move said carriers independently of each other lengthwise of the teeth on the respective internal surfaces.

6. The boring tool of claim 1, wherein the teeth of said internal surfaces are parallel to each other.

7. The boring tool of claim 1, wherein said carriers comprise a first carrier and a second carrier, and further comprising a bit secured to each of said carriers and extending radially outwardly beyond the respective carrier, as considered in the radial direction of said bar.

8. The boring tool of claim 1, wherein each of said securing elements is a screw having a head which is outwardly adjacent to the respective slot.

9. The boring tool of claim 1, wherein the axes of said tapped bores are disposed in a common plane including the axis of said bar.

* * * * *